(No Model.) 3 Sheets—Sheet 1.

A. S. DICKINSON.
CAR BRAKE AND STARTER.

No. 283,219. Patented Aug. 14, 1883.

WITNESSES:

INVENTOR

BY

ATTORNEY (No Model.) 3 Sheets—Sheet 2.
A. S. DICKINSON.
CAR BRAKE AND STARTER.
No. 283,219. Patented Aug. 14, 1883.
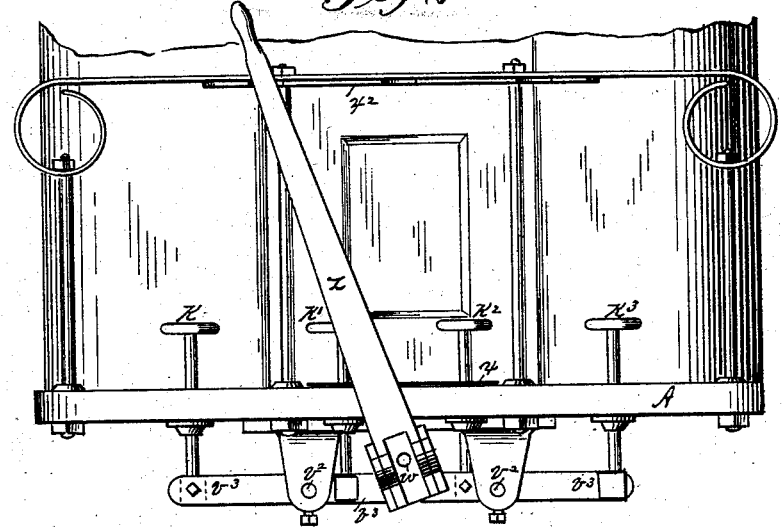
Fig. 2
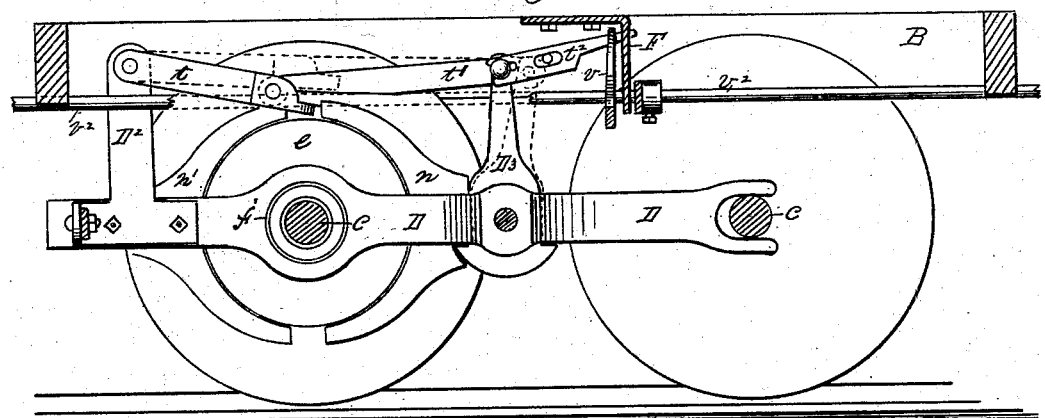
Fig. 3
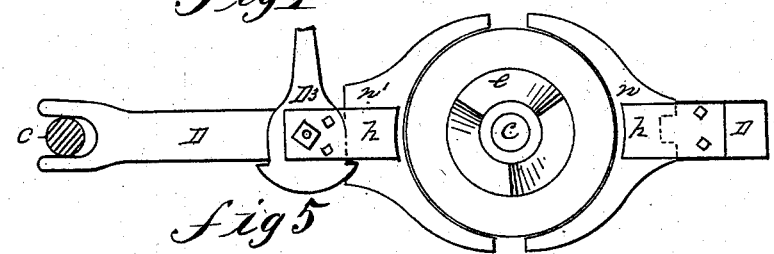
Fig. 4
Fig. 5
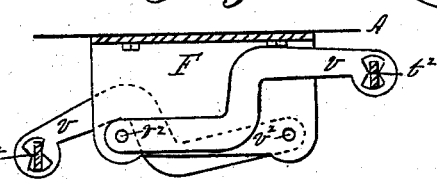
WITNESSES:
INVENTOR
Arthur S. Dickinson
BY Harry A. Chapin
ATTORNEY (No Model.) 3 Sheets—Sheet 3.

A. S. DICKINSON.
CAR BRAKE AND STARTER.

No. 283,219. Patented Aug. 14, 1883.

WITNESSES:

INVENTOR
Arthur S Dickinson
BY Henry A Chapin
ATTORNEY

UNITED STATES PATENT OFFICE.

ARTHUR S. DICKINSON, OF SPRINGFIELD, MASSACHUSETTS.

CAR BRAKE AND STARTER.

SPECIFICATION forming part of Letters Patent No. 283,219, dated August 14, 1883.

Application filed July 2, 1883. (No model.)

*To all whom it may concern:*

Be it known that I, ARTHUR S. DICKINSON, a citizen of the United States, residing at Springfield, in the county of Hampden and State of Massachusetts, have invented new and useful Improvements in Combined Car-Starting and Car-Brake Devices, of which the following is a specification.

This invention relates to improvements in car-starting and car-brake devices combined; and it consists in the combination, with car-wheels having ratchet-teeth on their inner opposite faces surrounding the axle, of a coil-spring around the axle having secured to each end thereof a ratchet and brake wheel to interlock with said car-wheels, and of mechanism, as hereinafter described, for moving said ratchet and brake wheels to engage one of them with either car-wheel, and of brake mechanism for clamping said ratchet-wheels by their peripheries, and for operating the above-named devices from the ends of the car, the object being to provide improved car-starting and car-brake devices combined, and improved means for operating said devices from either end of the car.

Figure 1:
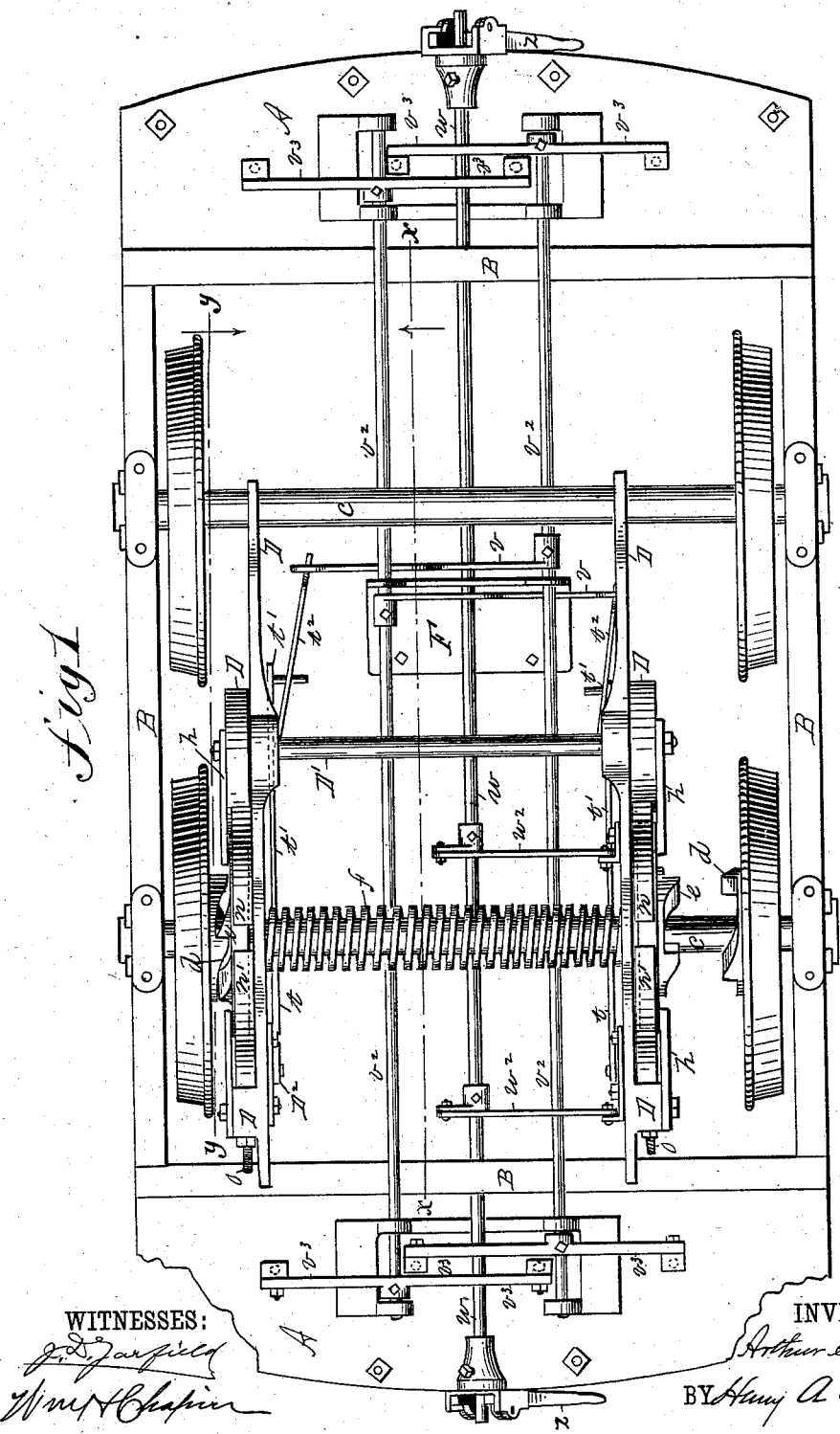
Figure 6:
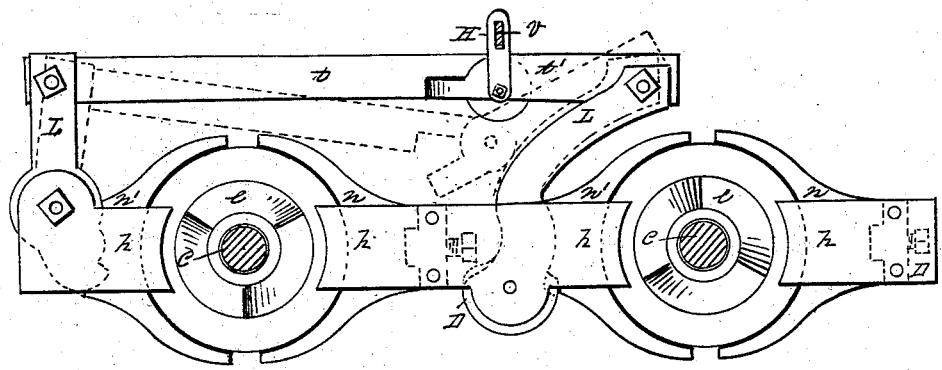
Figure 7:
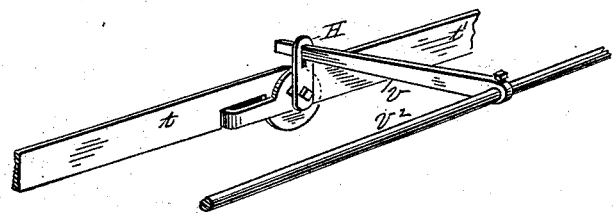

In the drawings forming part of this specification, Figure 1 is a plan view of the bottom of a car having applied thereto car starting and brake mechanism constructed according to my invention. Fig. 2 is an end elevation of the platform of the car. Fig. 3 is a sectional view on line $x\ x$, Fig. 1. Fig. 4 is a sectional view on line $y\ y$, Fig. 1. Fig. 5 is a detail view. Fig. 6 illustrates the manner of arranging the starting and brake devices to operate with both pairs of the wheels of a car. Fig. 7 is a detail view.

In the drawings, A is the platform of the car, and B is the truck-frame thereof. Two longitudinal frame-pieces, D, united by a cross-bar, D', constitute a brake-frame, one end of which has a fork-like engagement with one axle $c$, (see Fig. 3,) whereby the frame is sustained in a suitable position under the car, together with its connection with other mechanism having relation to the other axle $c$, as hereinafter described. Said brake-frame has secured to one end thereof an upright post, $D^2$, and has pivoted thereto a vibratory brake-lever, $D^3$, and said post and lever are united by two knuckle-jointed levers, $t\ t'$, whose movement is indicated by the dotted lines in Fig. 3. The end of lever $t'$ extends beyond its pivot-connection with lever $D^3$, and has a pin projecting from its side, as in Fig. 1. A lever, $t^2$, has a forked connection with said pivot-connection on lever $D^3$, and is slotted to let said pin on lever $t'$ pass through it. A horizontal brake-rod, $v^2$, is hung under the platform A in suitable end supports, and having a central support, F, which is capable of a rocking motion by means of the two-armed levers $v^3$, secured to its ends, which have foot-button connections $k'\ k^3$ thereon standing above the platform at each end of the car. An arm, $v$, is secured to said rod $v^2$, which engages with the end of the lever $t^2$, whereby the rocking motion of rod $v^2$ is caused to move levers $t\ t'$ from the position shown in Fig. 3 to that indicated therein by dotted lines, and whereby lever $D^3$ is made to swing in the direction indicated by dotted lines at its right. A semicircular brake-shoe, $n'$, is bolted rigidly to said brake-frame by a bolt, $o$, and a movable brake-shoe, $n$, is supported on said frame opposite to $n'$ and in engagement with the vibratory lever $D^3$, whereby it is given a movement toward and from the shoe $n'$. A ratchet-wheel, $e$, having teeth thereon to engage with corresponding ones on the adjoining face of the car-wheel, (the teeth on the latter being indicated by $d$,) is placed on the axle $c$, so that the latter may turn freely therein between the said brake-shoes $n$ and $n'$, and is adapted to be clamped rigidly between said shoes.

The devices above described as being on one side of the brake-frame and connected with the brake-rod $v^2$ are duplicated on the opposite side of the frame, to act, by a duplicate rod, $v^2$, on the wheel on the opposite end of axle $c$. Thus each end of a coil-spring, $f$, on the axle is secured to a ratchet-wheel, $e$, heretofore described.

A rock-shaft, $w$, is hung centrally under the platform A, having on each end of it a lever, $z$, whereby said shaft is rocked, for the purpose hereinafter set forth. The levers $z$ are attached to the shaft $w$ by pivot-connections, which permit them to have a certain vibratory motion in the direction of the length of the shaft.

A notched plate, $x^4$, is secured to the railing at the end of the car, provided with suitable notches in its edge, with which the levers $z$ are adapted to engage to hold them in a position to which they may be swung. The shaft $w$ is so hung under the car as to permit it to have a slight longitudinal movement. A fulcrum-plate, $x$, is placed on the platform A, to project a little beyond the end of the latter, and to have its edge very near to or against the inner side of lever $z$ when the latter is swung into the notches in plate $x^2$. The purpose of plate $x$ is to provide a fulcrum or abutment against which the lever $z$ at one end of the car is forced, when, by drawing the end of the lever at the opposite end of the car toward the railing, the shaft $w$ is made to slide endwise, thus so swinging the first-named lever as to throw it away from plate $x^2$, so that it will not interfere with the operation of the shaft $w$ from the other end of the car. Thus, if the lever $z$ is in engagement with either of the notches in plate $x^2$, the operator at the opposite end of the car can disengage it without leaving his position.

The rock-shaft $w$ is connected with the aforesaid brake-frame by the rods $w^2$, which are attached to suitable arms on said shaft, and by operating the levers $z$, as above described, said frame is moved between the wheels of the opposite sides of the car to carry either one of the ratchet-wheels $e$ into engagement with the teeth of one of the car-wheels.

When the brake-frame is moved transversely on the axle $c$, as above described, the levers $t^2$, connected with the above-described brake mechanism and having one end engaging with the levers $v$ on shaft $v^2$, are given a certain oscillatory movement; hence the arrangement of the pin on lever $t'$ to project through a slot in lever $t^2$, whereby, whatever may be the position of the brake-frame, the lever $t^2$ is free to be operated.

The mechanism above described as applied to the brake and starting mechanism of one pair of wheels may be duplicated upon a second pair, and when so arranged the knuckle-jointed levers $t$ $t'$ are hung between two vibratory levers L L, acting, as above described, against movable brake-shoes $n'$. Plates $h$ are secured to the sides of the frame-strip D, and extend a little way over the faces of the wheels $e$, to support them in proper position and compel them to move with the brake-frame back and forth on the axles. When the knuckle-jointed levers are connected as in Fig. 6, which illustrates said double connection, a link, H, is attached to said levers, which receives the end of lever $v$ on shaft $v^2$.

The operation of my improvements is as follows: To cause the starting devices to be brought into action while the car is in motion and about to be stopped, the lever $z$ is swung to one side, moving the brake-frame and its connected devices toward one of the car-wheels, and bringing one of wheels $e$ into engagement with the teeth of the car-wheel. The operator then presses down button $k'$, rocking the shaft $v^2$, which, by its arm $v$, is in connection with the braking devices and ratchet-wheel which are not in engagement with the car-wheel, thereby clamping the free ratchet-wheel between the shoes $n$ $n'$, thus preventing it from turning and causing the spring $f$ to be wound up by the ratchet-wheel which is in engagement with the revolving car-wheel. When the car stops, or, if the operator desires to stop it after the spring has been wound up, he presses down button $k^2$, thus rocking shaft $v^2$, which is in connection with the brake mechanism of the ratchet-wheel in engagement with the car-wheel, causing said ratchet-wheel to be clamped between the shoes $n$ $n'$, and preventing it and the car-wheel from turning, thus bringing the car to a stop with spring $f$ wound up. When said brake mechanisms are operated as above described, the knuckle-jointed levers are thrown just a little out of line, so that they remain in a fixed locked position until released by a contrary motion of shaft $v^2$. To start the car, the hand-lever $z$ is thrown over, to move the brake-frame from the car-wheel which is engaged with wheel $e$ to the opposite side, and engage the other ratchet-wheel with its adjoining car-wheel. The operator then operates the brake-shoes which clamp the last-named ratchet-wheel (through one of shafts $v^2$) to free the latter and let the spring $f$, in unwinding, turn it and the car-wheel it is engaged with. Thus the car is started. Then the lever $z$ is brought to a central position, bringing the brake-frame where neither of wheels $e$ will engage with a car-wheel.

To employ the wheel $e$ and brake devices so that they act only as brakes, the brake-frame is moved to one side, engaging a wheel, $e$, with the car-wheel, and at once the aforesaid means are used to clamp said engaged wheel between the shoes $n$ $n'$. The brakes are let off by swinging the brake-frame to the center and unclamping the shoes.

What I claim as my invention is—

1. The combination, with the opposite car-wheels of a car and their axle, each wheel having a series of ratchet-teeth thereon, of two ratchet-wheels hung on said axle and adapted to engage with said car-wheels, of a coil-spring connected between said ratchet-wheels, of a brake-frame, substantially as described, connected with said ratchet-wheels and suspended upon the axles of the car, and capable, by mechanism, substantially as described, of transverse movement between said car-wheels, of the fixed and movable brake-shoes $n'$ $n$, hung in said frame, and of mechanism, substantially as described, for clamping said shoes upon and unclamping them from said ratchet-wheels, substantially as set forth.

2. The combination of the brake-frame, the wheels $e$, spring $f$, shoes $n$ $n'$, levers $t$ $t'$ $t^2$, shaft $v^2$, having lever $v$ thereon, and the double-armed levers $v^3$, provided with foot-buttons, and the car-wheel having teeth $d$ thereon, substantially as set forth.

3. The combination, with the brake-frame, the wheels $e$, and spring $f$, and brake mechanism, substantially as described, of the rock-shaft $w$, connected with said frame, of the levers $z$, pivoted to said shaft, and of the plates $x$ and $x^2$, attached to the platform of the car, substantially as set forth.

ARTHUR S. DICKINSON.

Witnesses:
WM. H. CHAPIN,
J. D. GARFIELD.